United States Patent
Cukier et al.

[11] Patent Number: 6,101,187
[45] Date of Patent: Aug. 8, 2000

[54] METHOD AND SYSTEM FOR MULTICASTING CELLS IN AN ATM PROTOCOL ADAPTER

[75] Inventors: Maurice Cukier, Nice; Michel Poret, Gattieres; Jocelyne Jaumes, Pibrac, all of France

[73] Assignee: International Business Machines Corporation, Armonk, N.Y.

[21] Appl. No.: 08/988,017

[22] Filed: Dec. 10, 1997

[30] Foreign Application Priority Data

Dec. 20, 1996 [EP] European Pat. Off. ............... 96480122

[51] Int. Cl.[7] .................................................. H04L 12/56
[52] U.S. Cl. ........................... 370/396; 370/413; 370/417
[58] Field of Search ..................................... 370/395, 465, 370/466, 397, 399, 389, 412

[56] References Cited

U.S. PATENT DOCUMENTS

| | | | |
|---|---|---|---|
| 5,602,841 | 2/1997 | Lebizay et al. | 370/413 |
| 5,666,361 | 9/1997 | Aznar et al. | 370/392 |
| 5,684,797 | 11/1997 | Aznar et al. | 370/390 |
| 5,867,653 | 2/1999 | Aras et al. | 709/204 |

*Primary Examiner*—Hassan Kizou
*Assistant Examiner*—Hanh Nguyen
*Attorney, Agent, or Firm*—Gerald R. Woods

[57] ABSTRACT

A protocol adapter for an Asynchronous Transfer Mode (ATM) cell switching system has a receive part and a transmit part, the receive part being arranged to convert an incoming ATM cell into a cell structured with a payload and a header including an output index (OI). The transmit part is arranged to convert the structured cell after it is routed through the switching system into an ATM cell, and to output the ATM cell on the ATM communication lines. The transmit part has cell processing logic for adding a bit (mother-bit) in the header of each incoming structured The output index of a mother cell is used to access a location in a look-up table which contains for each output index, a multicast bit for indicating whether the cell is to be multicasted or not, a queue index for indicating a location where to enqueue the cell before it is outputted from the transmit part, a new VP/VC/Li value for constructing a new header, and a next-output index. For the multicast cells, the queue index is replaced by a multicast-queue index in order to store the multicast cells in a dedicated multicast queue. When a multicast mother cell reaches the head of the multicast queue, one or more daughter cells are generated by duplicating the payload of the current mother cell but assigning a different destination address.

6 Claims, 6 Drawing Sheets

FIGURE 1

(PRIOR ART)

METHOD AND SYSTEM FOR MULTICASTING CELLS IN AN ATM PROTOCOL ADAPTER

TECHNICAL FIELD

The present invention relates to telecommunication and more particularly to an ATM protocol adapter providing capabilities of operating multicast cells.

BACKGROUND OF THE INVENTION

The "Broadband Integrated Services Digital Network" or B-ISDN is a new telecommunication technology developed by the telecommunication industry for both data transmission and telecommunications applications. B-ISDN is conceived as a carrier service to provide high speed communications to end users in an integrated way.

The technology selected to deliver the B-ISDN service is called "Asynchronous Transfer Mode" or ATM. The almost universal acceptance of ATM comes from the fact, that ATM handles a heterogeneous mix of communication traffic such as voice, data, image, video, and high quality sound. ATM can be used both in the LAN (Local Area Network) and the WAN (Wide Area Network) network environments and offers seamless interworking between the two environments.

ATM is effective in a much wider range of communications environments than any previous technology. However ATM is a compromise. ATM does not handle voice as efficiently (or as cost effectively) as does an isochronous network. ATM does not handle video as easily as isochronous transfer systems do (although ATM is more efficient). ATM certainly does not handle data as effectively or efficiently as a Packet Transfer Mode or Frame Relay system. ATM is likely to be problematic in any high error rate environment (such as some slower copper wire connections). Nevertheless ATM handles all types of traffic adequately and in an integrated way. This means that instead of having a proliferation of many specialised kinds of equipment for different functions it is now possible to have a single type of equipment and network which will do everything.

ATM technology is based on several key concepts. One key concept is that all information (voice, image, video, data . . . ) is transported through the network in very short, fixed length (48 data bytes plus a 5-byte header) blocks called "cells". The ATM cell size was determined by the Standardization Group CCITT (now called ITU) as a compromise between voice and data requirements. Another key concept is that ATM is designed so that simple hardware based logic elements may be employed at each node of a network to perform the switching. On a link of 1 Gbps, a new cell arrives and a cell is transmitted every 0.43 microseconds, leaving little time to decide what to do with an arriving cell.

Another key concept is that information flow is along paths called "Virtual Channels" (VC), which can be grouped into "Virtual Paths" (VP) established over physical links or lines and set up as a series of pointers through the network. Each cell header contains identifiers, called "Virtual Path Identifier" and "Virtual Channel Identifer" (VPI,VCI) that identify the connection that the cell belongs to and that allow the network nodes (sometimes identified as switches) to route the cell towards its destination. Cells on a particular Virtual Channel always follow the same path through the network and are delivered to the destination in the same order in which they are received.

A Virtual Channel Connection is a end-to-end logical connection along which a user sends data from a source to a destination. A multicast Virtual Channel Connection is a one-to-multiple logical connection along which a user sends data from a source to multiple destinations. Virtual Channel Connections may be established using many different types of media and need to be handled individually to guarantee that the traffic characteristics (such as rates, burstiness, quality of service) defined for the connection are met. This concept allows a cell which is to be multicasted to N destinations to be physically transported over less lines than the full N lines required in the previous systems.

Further information about ATM and other high speed networks can be found in a number of publications; for example, the International Teleconmmunication Union (ITU) Recommendations.

Generally, an ATM network is a set of ATM switch nodes connected and linked together by physical lines (carrier links) and used to route cells between ATM endpoints (source or destination endpoints). In the past, most of the switches were homogenous since the same transmission protocol was used throughout a network to transport the same kind of data. Private Branch Exchange P.B.X.) which handled the same format of information. More recently, the marketplace has required the development of heterogenous or multi-protocol switches which are able to handle multiple different protocols.

Basically, in a multi-protocol switch, input data lines must be connected to an adapter which includes a special device, a "protocol engine" which operates on data provided over the input data lines to package that data in a cell format needed by the switching elements. The switch node is designed to operate with a multitude of adapters, each of which converts input data from a particular format to the comment cell format employed within the switch.

In the emerging world of diverse communication traffic (multimedia, video distribution/conferencing) there is a need for a system having the capability of handling multipoint connections; that is, of sending the same cell to different end-users. Cells intended for multiple end-users are called multicast or broadcast cells. Generally, the source of a multicast cell does not have complete addressing information for each of the cell's multiple destinations. The multicasting function must be provided at the nodes of the network. This requirement has been taken into account in various switch implementations. A typical one is the so-called shared buffer type which is particularly attractive, and allows such an implementation with ease.

U.S. Pat. No. 5,394,397 from Yanagi et al. describes an ATM switching system which includes an input interface which is provided every incoming line and serves to convert header information of each input cell into internal routing information, a shared buffer memory and a cell writing control unit which forms normal cell list structures which are prepared in correspondence to outgoing lines and in which a plurality of normal cells are chained together with their next addresses. Cells to be multicasted are chained together with their next addresses in a broadcast cell list structure located within a switch device. A cell reading control unit includes a broadcast destination table and allows reading of cells from the broadcast cell list in lieu of normal cells. Although multicasted cells are simultaneously generated on the different outputs, one drawback of this system is that a cell cannot be sent several times on the same output.

U.S. Pat. No. 5,410,540 from Aiki et al. describes several embodiments based on different implementations of a shared-buffer-type ATM switch including a shared buffer memory, a multiplexer, a demultiplexer, a buffer memory controller and a cell copy section disposed between the multiplexer and the memory. The cell copy section produces a plurality of copies of a broadcast cell according to information in a copy information table and adds associate routing information to each copied cell so as to write the cells in the memory. In response to an indication from an output counter, the cells are read from the memory to be distributed to output ports, thereby implementing the broadcast function. Although this implementation improves the throughput of the ATM switch, the multicast cells are sent only once on the different output ports and the system does not guarantee that there will be no cell loss in case of bursty traffic associated with multicasts.

None the aforementioned prior art systems is capable of handling multiple protocols.

SUMMARY OF THE INVENTION

It is an object of the invention to provide a protocol adapter which can performing multicasting operations and which can handle input data formatted in accordance with more than one protocol.

In accordance with the invention, an Asynchronous Transfer Mode (A.T.M.) Protocol adapter (PA) has a receive part and a transmit part. The receive part converts an incoming ATM cell into an internal cell structured with a payload and a header including an output index (OI) characterizing a specific operation which is to be executed in the transmit part. The transmit part converts the structured internal cell following switching through a switch fabric to an ATM cell and outputs the ATM cell to ATM output communication lines. The transmit part adds a special bit (mother-bit) to the header of each incoming structured internal cell in order to differentiate cells coming from the switch fabric (also called mother cells) from cells which result from duplication within the transmit part. The mother-bit is reset for duplicated cells (also called daughter cells). The output index of the cells is used to access a location in a look-up table which contains, for each output index, a multicast bit for indicating whether the cell is to be multicasted or not, a queue index for indicating a location where to load the cell before it is outputted from the transmit part, a new VP/VC/Li Value for constructing a new header, and a next-output index.

For multicast cells, the queue index is replaced by a multicast-queue index in order to store the multicast cells in a dedicated multicast queue. When at the head of the multicast queue, the multicast cell is duplicated if there is no incoming cell from the switching system. The duplication process is repeat operated for the current multicast cell until a needed number of copies have been made. After the last needed copy is made, a new multicast cell can be selected.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following description when read in conjunction with the accompanying drawings, described briefly below.

DETAILED DESCRIPTION OF THE PREFERRED EMBODIMENT

Figure 1:
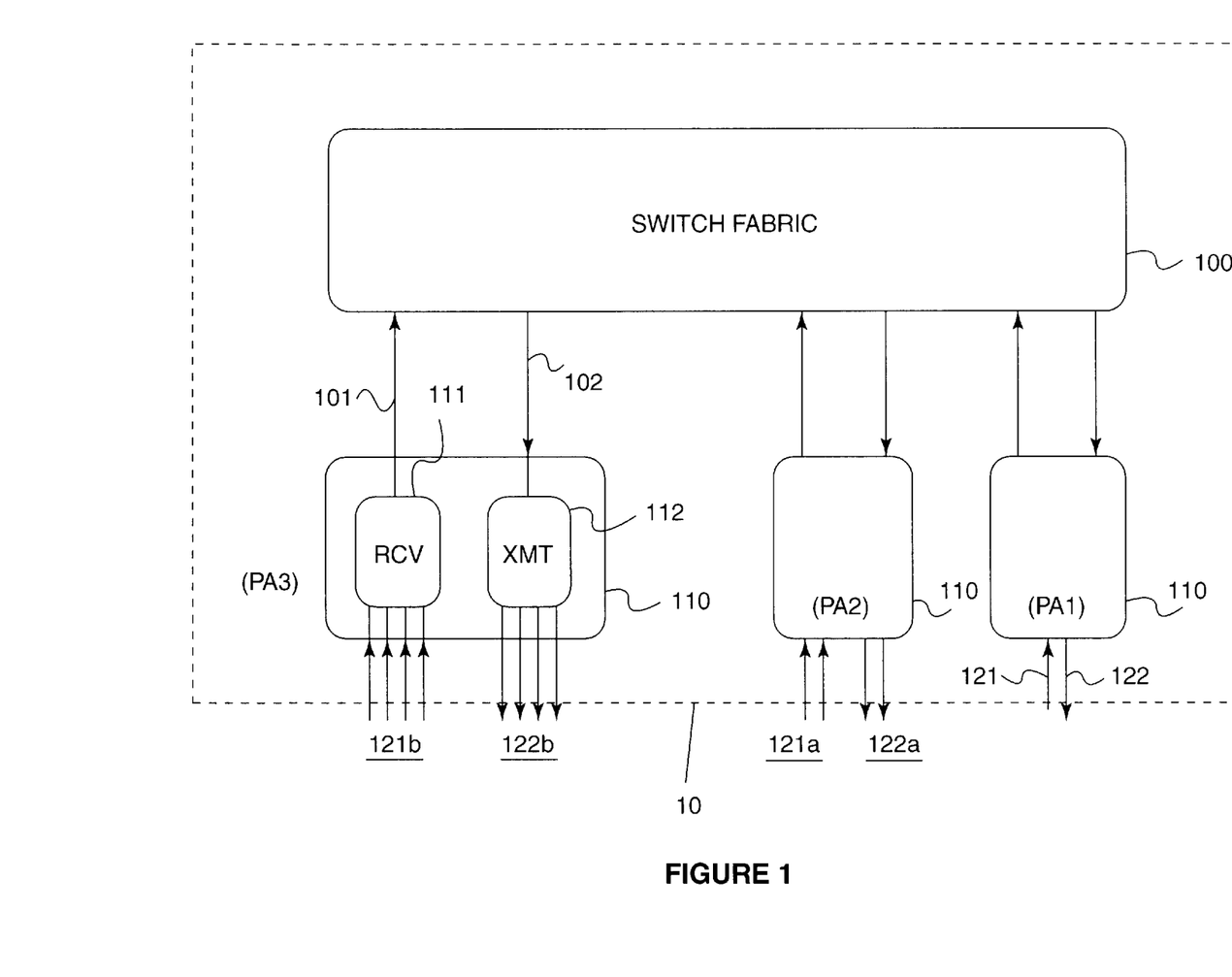
FIG. 1 is a view of an ATM switch node in which a preferred embodiment of the invention may be implemented.

As shown in FIG. 1, an ATM switch node (10) comprises a switch fabric 100 connected to a plurality of protocol adapters 110, each of which is connected to the switch fabric at a switch port through a receive-switch-bus, such as bus 101, and a transmit-switch-bus, such as bus 102. A particular embodiment of a protocol adapter is described in detail in copending patent application__(FR996045)__entitled Asynchronous Transfer Mode Protocol Adapter for a High Speed Cell Switching System, having the same priority date than the present application, assigned to the same assignee and incorporated herein by reference.

Only the protocol adapter elements required to perform the multicast operation will be described herein. Reference may be made to the cited copending patent application for a the description of the basic functions performed within the protocol adapter.

Each protocol adapter 1 10 may support a variable number of ATM communication lines (121, 122) on which ATM cells are received from or transmitted to an end-user (ie. a terminal or another switching node not shown). The transmission lines or links may have identical or different transmission speeds. In the example of FIG. 1, three protocol adapters are connected to the switch fabric. The first protocol adapter (PA1) supports one input line 121 and one output line 122. The second protocol adapter (PA2) supports two input lines 121a and two output lines 122a, while the third protocol adapter (PA3) supports four input lines 121b and four output lines 122b.

For a switch device having a throughput of 800 Mbps, protocol adapter 1 could, for example, be connected to a transmission line running at 622 Mbps (such as defined in the ITU-T STM4 data rate), while protocol adapter 3 could present four transmission lines running at 155 Mbps (such as defined in the ITU-T STM1 data rate). protocol adapter 2 could present one transmission line running at 155 Mbps while the other line could be one running at a lower speed such as 34 or 45 Mbps (such as defined in the ITU-T E3 or T3 data rate). The possible combinations of protocol adapters and lines running at different speeds is certain not limited to the combination described above. Other combinations can be adopted without departing from the scope of the invention.

Each protocol adapter 110 includes a receive (RCV) block circuit 111 which handles ATM cells appearing on input lines 121. In a preferred embodiment, the receive block is based on a pipeline structure that successively performs elementary operations in order to convert an arriving cell into an internal or switch cell which is directed to the switch fabric 100 on a bus 101. Each protocol adapter 110 also includes a transmit (XMT) block circuit 112 which handles cells coming from the switch fabric 100 on bus 102 and converts them to a format which can be output on communication lines 122.

Figure 2:
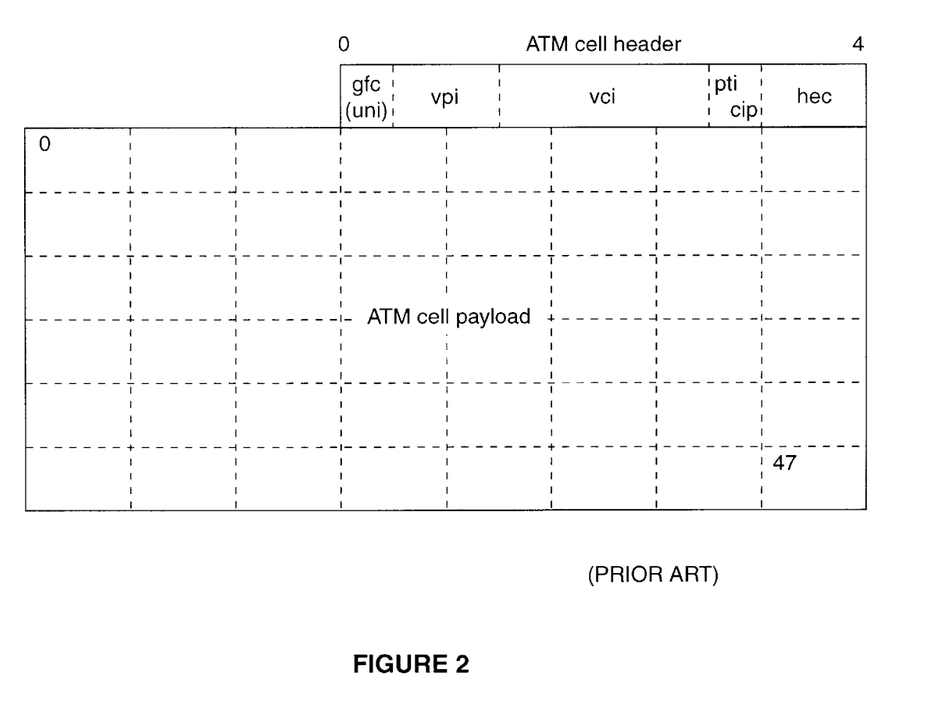
FIG. 2 shows the format of a standard ATM cell.
Figure 3:
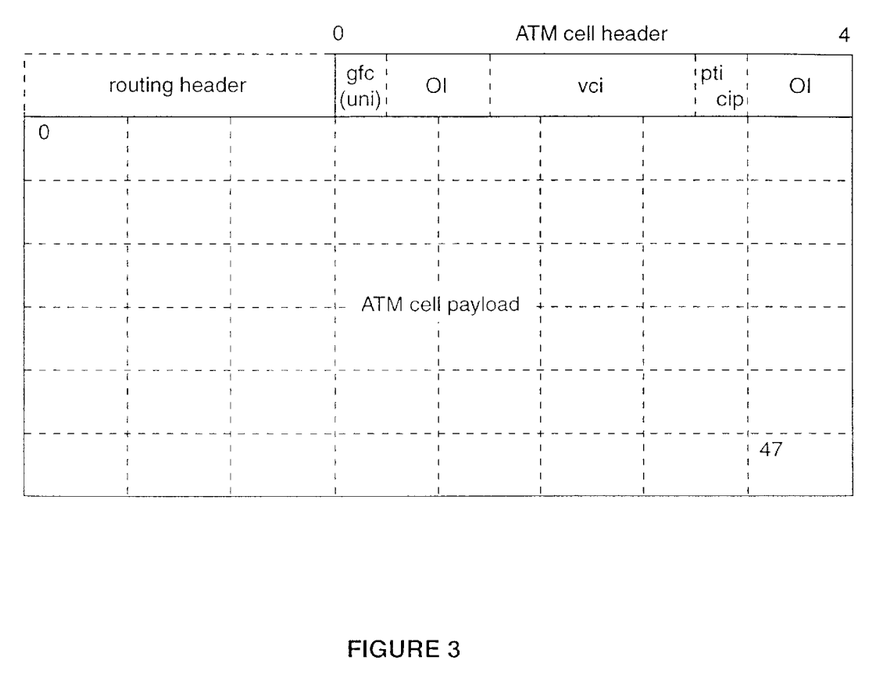
FIG. 3 shows the format of a cell intended for use with the invention.

In one embodiment of the invention, the format of an ATM cell received by a protocol adapter thru the receive circuit is in conformance with the ITU standardized structure as shown on FIG. 2. The standard ATM cell has a fixed length and consists of a 5-byte header for control information and a 48-byte data field, also called a payload. The header has several fields for carrying different kinds of control information. Two header fields, a Virtual Path Identifier (VPI) field and a Virtual Channel Identifer (VCI) field, identify the connection to which the cell belongs. A Header Error Check (HEC) field allows the detection and correction of single-bit errors or the detection of multi-bit errors. However, packets other than standard ATM cells may be processed thru the protocol adapter After the cell is received by the (RCV) circuit, conventional operations such as cell header validation, VPI/VCI fields recognition, conformance to traffic parameters (policing) are performed. Once the cell header has been examined and validated in the (RCV) circuit, the VPI and the HEC fields are free for carrying new information. They are then updated with an index later used as a token between the input protocol adapter and the output protocol adapters. The index generally called output index (OI) is used in the transmit part of the protocol adapter as a pointer to resources which define the connection on which the cell is to be sent. These resources include header information such as a new VPI value and, optionally, a new VCI value as well as control information for the internal processing of the cell within the transmit circuit, such as output queue management. In parallel with the updating of the cell header with the output index, a routing header is added to the cell to include routing information further used by the switch fabric to determine where to route the cell.

If several switch ports are designated, a multicast function is provided by the switch fabric. The multicast function is not essential to an understanding of the invention and is not described. A description of a multicast mechanism may be found in the referenced copending patent application. When the switch fabric completes its processing, the cell is outputted onto the corresponding bus (102).

The structure of the cell arriving at the designated protocol adapters is shown on FIG. 2, wherein the VPI and the HEC fields have been updated by the output index OI. After the cell is received by each designated protocol adapter, the operation of outputting it towards its final destination (one or several end-users) is performed through the transmit (XMT) circuit 112.

Figure 4:
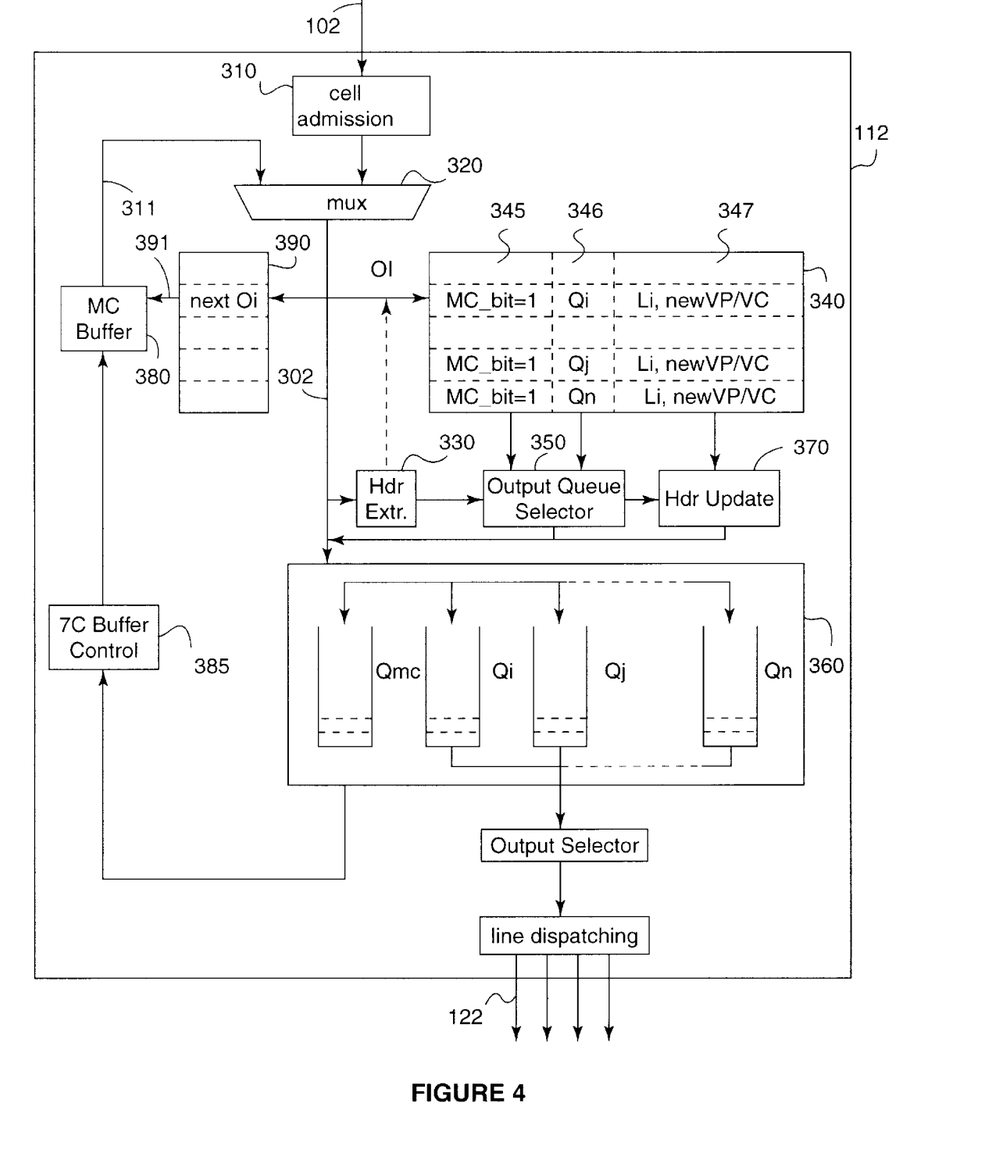
FIG. 4 is a detailed view of an embodiment of the multicast circuit of the invention.

FIG. 4 is an exploded view of a (XMT) circuit 112 within a protocol adapter. Each incoming cell received on bus 102 first enters a cell admission circuit 310, which functions to detect the presence of an incoming cell. At the time a cell is inputted in the cell admission circuit, a bit, referenced as a 'mother-bit' flag, is added to the routing header of the incoming cell. For convenience the stamped incoming cells are identified as "mother cells". Once the cell admission function is performed, the mother cell is supplied to a multiplexer circuit 320 which inputs another type of cell thru an internal bus 311. For clarity of the description, the cells inputted from bus 311 are called "daughter cells." As will be fully explained below, daughter cells are derived from mother cells which are to be multicasted. The payload of a daughter cell is identical to the payload of its mother cell whereas mother and daughter cells have different headers, reflecting their different destinations.

With the system of the invention, the multicast operation consists of generating a daughter cell, corresponding to a mother cell, each time there is no incoming cell at the cell admission circuit input. This operation is repeated until all needed daughter cells for a given mother cell are generated. After the last needed daughter cell of a group is generated, a new multicast mother cell supersedes the previous one to initiate a new daughter cell generating process. The conditions under which the daughter cells are generated and processed are explained below.

If a mother cell is detected in admission block 310, multiplexer 320 outputs it on bus 302. If there is no mother cell at the admission circuit input, the multiplexer outputs a daughter cell if a multicast mother cell is only partially processed. It is important to note that once a daughter cell is generated and outputted from multiplexer 320, it is thereafter processed as any unicast cell.

After a cell (mother cell or daughter cell) is output from multiplexer 320 through bus 302, it is supplied to a header extraction circuit 330 which detects the value of the output index (OI) carried in the cell header. As previously mentioned, the output index is used as a pointer for resources associated with the cell. In a preferred embodiment, the output index points to a look-up table 340, which may be implemented with RAM or registers, having at least the fields described below. The look-up table contains several information areas (345, 346, 347), each being addressed by the output index of the corresponding cell. The parameters contained in the information areas are set by a controller (not represented) and may be updated each time a new connection is set up.

The first information area 345 is a one bit field wherein a multicast bit (also called MC_bit) is set or reset to indicate whether the cell is to be multicasted or not. A second information area 346 contains a queue Index which is a reference to a particular output queue (Qi,Qj,Qn). The queues are located in an output cell memory 360 and are used to enqueue unicast cells which may be either mother cells or daughter cells. The queue index value is used by output queue selector 350 to determine an address within the output queue where to load the cell. In another area 347, new VPI and new VCI values are stored. The new VPI/VCI values will be carried in fields of the cell header when the cell is outputted from the protocol adapter. Additionally, a line index parameter Li is also stored in the look-up table to indicate on which output line 122 the cell is to be sent.

The update of the cell header with the new parameters is performed under the control of a header update circuit 370 before the cell is enqueued in the output cell memory. Then the updated cell is loaded into an assigned queue (Qi,Qj,Qn) of memory 360. When the updated cell reaches the head of its queue, it can be read out through bus 365. The selection of the active queue is performed by an output queue selector and a line dispatching circuit directs the selected cell to the correct output line 122. These are known functions and will not be described in detail.

Referring again to the multicast bit (MC-bit) associated with each cell and located in a field of the look-up table, the MC-bit is set by the control means to differentiate a unicast cell from a multicast cell. When the output index of a mother cell points to a MC-bit identifying the cell as a unicast cell, then the cell header is updated as previously explained and the new cell is enqueued in a unicast queue (Qi,Qj,Qn). When the output index of a mother cell points to a MC-bit indicating that the cell is a multicast one, then the cell is enqueued in a multicast queue (Qmc) by the output queue selector 350. The output queue selector replaces the queue index contained in the corresponding area field 346 with a multicast queue index corresponding to the multicast queue. In parallel, the header update circuit 370 is disabled to prevent updating of the cell header of the multicast mother cell.

The multicast queue (Qmc) is a dedicated queue which contains only multicast mother cells. In a preferred embodiment, the multicast Queue (Qmc) is a predefined storage area within the output cell memory 360 for ensuring the same system ability to handle bursty traffic for multicast cells as for unicast ones. Other implementations, such as an independent storage memory, are of course possible for the multicast queue.

After being stored in the multicast queue, a multicast mother cell is ready to be duplicated. A cell at the head of the multicast queue (Qmc) is transferred into a multicast buffer 380, where it is stored until the end of the duplication process. Read out and Write operations of the multicast cell are performed through a multicast buffer control circuit 385. The multicast buffer 380 is a one cell buffer which stores the cell to be multicasted as long as the multicast process related to this cell is underway, as indicated by means of a flag referred as MC-buffer-full. Concurrently with the transfer of the cell from the multicast queue Qmc into the multicast buffer, the mother-bit flag in the cell header is reset by the MC-buffer control block 385, stamping the cell as a daughter cell ready to be processed as explained below.

The cell stored in multicast buffer 380 is read out when the cell admission circuit 310 does not detect any incoming cell on bus 102. It is a significant feature of the invention that multicast processing is performed using time periods during which no cells are being received from the switch fabric. After the daughter cell is outputted from multiplexer 320, the output index (OI) points into the corresponding areas of the look-up table 340 to determine into which output queue (Qi,Qj,Qn) the daughter cell is to be loaded. For this operation, the output queue selector 350 and the header update circuit 370 are active. Thus, the new VP/VC values as well as Li value are written in the cell header. The first and following daughter cells are processed as unicast cells.

Additionally the output index points into a multicast table 390 which provides a next-output index which is used by the next daughter cell in order to point at the corresponding fields in the look-up table. The next-output index is transferred thru a bus 391 to update the old OI field of the daughter cell stored in the MC-buffer 380. The multicast table 390 contains the lists of output index for each multicast cell. In a preferred embodiment, the multicast table 390 is a memory located within the look-up table 340 and has as many entries as the look-up table, in order not to restrict the possible number of multicast destinations. The multicast table is updated together with the look-up table by the control means when a multicast destination is added or removed from the network.

The multicast process as described above continues for a daughter cell stored in the MC-buffer 380 as long as the multicast bit (MC-bit) pointed to by the output index is active. For the last daughter cell belonging to a particular a mother cell, the output index points to an reset multicast bit. In parallel, the MC-buffer-full flag is reset to indicate that the multicast buffer 380 is ready to store a new multicast mother cell.

Figure 5:
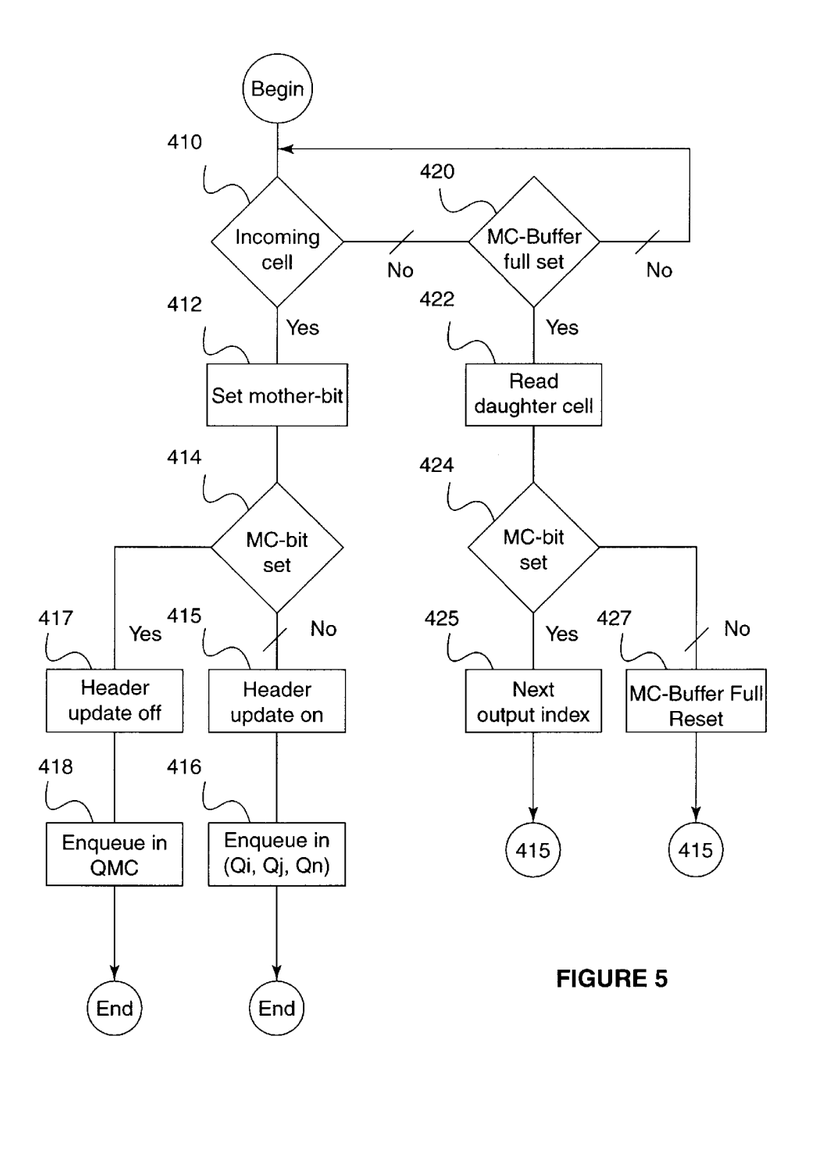
FIG. 5 is a flow chart of the steps performed to enqueue ATM cells in accordance with the invention.

FIG. 5 illustrates the process performed to enqueue a cell into the output memory 360. In block 410 a first test is performed to determine if a cell from the switch fabric is arriving on bus 102. If the result is YES, then the mother-bit flag is set in block 412, and the incoming cell is thus stamped as a mother cell. The next step 414 is to determine whether the incoming cell is a unicast or multicast cell by examining the look-up table to see whether the multicast bit MC-bit is set or reset. The output index (OI) points to the corresponding field 345 which contains the value of MC-bit. If MC-bit is reset (branch NO), then the mother cell is a unicast cell, and the next step 415 is to update the cell header thru the header update circuit 370. The final step 416 is to enqueue the unicast cell into the designated queue (Qi,Qj,Qn) of the output memory 360.

Coming back to test 414, if MC-bit is set (branch YES), meaning that the current mother cell is a multicast cell, then the header update circuit is turned OFF as shown at block 417. The final step 418 is to enqueue the multicast cell in the multicast queue Qmc.

Coming back to test 410 which checks whether there is an incoming cell from the switch fabric, if the result is NO, then a further test is performed at block 420. In block 420, the multicast buffer is inspected by testing the MC-buffer-full flag. If the flag is reset (branch NO) meaning that MC-Buffer 380 is empty then the process loops back to step 410. If the flag is set (branch YES) meaning that a cell is currently loaded into the multicast buffer, the next step 422 is to read out the daughter cell from MC-buffer 380, and output it from the multiplexer 320. At block 424 the value of the multicast bit is checked. If MC-bit is set (branch YES), meaning that the current daughter cell is not the last one for the current mother cell and that another daughter cell will have to be generated, then at step 425 the output index field of the cell stored in the multicast buffer is updated with the next-output index value stored in the multicast table 390. Finally the process is ended with steps 415 and 416. Referring again to block 424, if the multicast bit is reset (branch NO) meaning that the current daughter cell is the last cell to be generated for the current mother cell, then the MC-buffer-full flag is reset in step 427 in order to indicate that the multicast buffer is free for storing a new multicast cell. Finally, the process is ended with steps 415 and 416.

Figure 6:
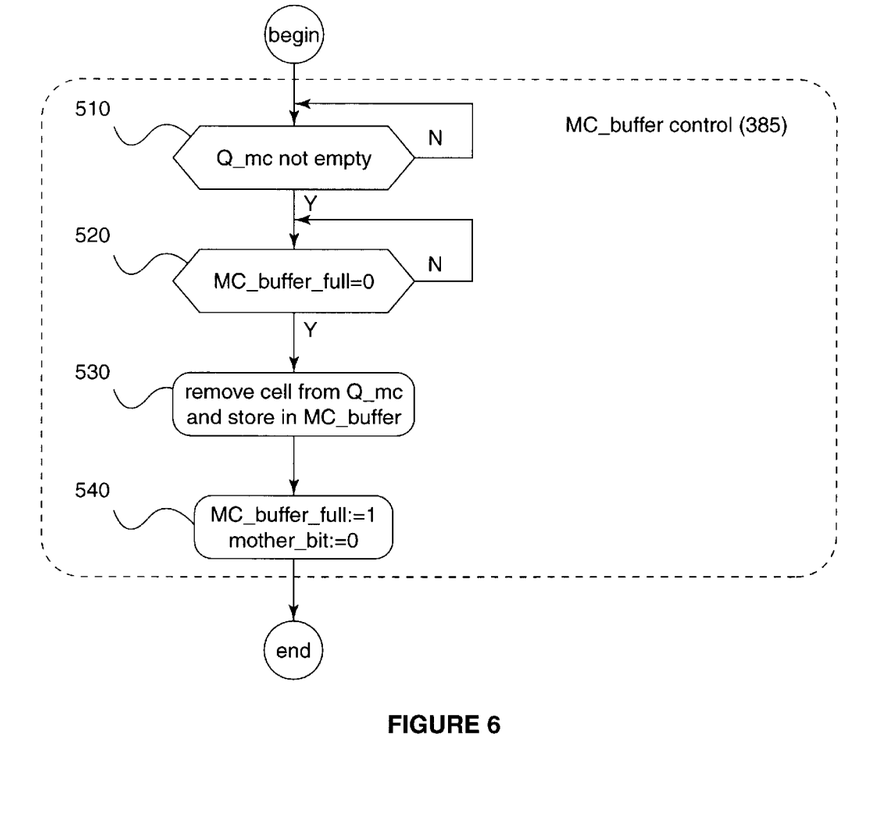
FIG. 6 is a flow chart of the steps performed to replicate a multicast cell.

FIG. 6 is a flow diagram of the process performed to store a multicast cell in the multicast buffer 380. The process begins with a first test performed at block 510 which checks whether the multicast queue Qmc is full or empty. If the result is NO, meaning that no multicast cell is waiting to be processed, then the system loops back. If the result is YES, a second test is performed at block 520 to check if the multicast buffer is free to store a multicast cell. The value of the MC-buffer-full flag is tested. If MC-buffer-full flag is set (branch NO), the process loops back until the last daughter cell of the previous multicast mother cell is generated. If MC-buffer-full flag is reset (branch YES), the multicast cell at the head of the multicast queue Qmc is read out and stored in MC-buffer 380, as indicated in block 530. Finally in step 540, the MC-buffer-full flag is set to lock the Multicast Buffer, and mother-bit in the header of the multicast cell which is stored into the multicast buffer is reset to indicate that the cell is from now a daughter cell.

The invention has a number of advantages. It is a compact, unique mechanism for processing both unicast cells and multicast cells. The use of a multicast queue prevents conflicts between a flow of cells to be multicasted and even a possibly bursty flow of unicast cells from the switch fabric. The multicast table offers a flexible system for easily updating new cells processed by each protocol adapter.

A preferred embodiment of the invention is described in detail above. Variations and modifications to that embodiment may occur to those skilled in the art once they learn of the preferred embodiment. Therefore, it is intended that the appended claims shall be construed to include both the preferred embodiment and all such variations and modifications as fall within the true spirit and scope of the invention.

What is claimed is:

1. An Asynchronous Transfer Mode (ATM) protocol adapter for a cell switching system including:
   a receive part for converting an incoming ATM cell into a structured cell having a payload and a header including an output index characterizing a specific operation which is to be executed on the structured cell;
   a switch fabric for switching the incoming structured cell to a transmit part as a function of the contents of the cell header; and
   a transmit part for accepting each structured cell after it is routed through the switch fabric, said transmit part including
      cell classification logic adding a mother-bit to each accepted structured cell, the binary value of said mother-bit identifying the cell as either a mother cell or as a daughter cell,
      table look-up logic for accessing a table location designated by the output index in a cell to retrieve a multicast bit indicating whether the cell is to be multicasted or unicast, a queue index identifying an output queue for the cell, new routing information to be used in a new header for the cell and a next-output index, and
      multicast logic for storing a mother cell which is to be multicasted and for generating one or more daughter cells from the stored mother cell, each of said daughter cells having the same payload as the mother cell but a different header, said multicast logic operating to generate daughter cells only when no cell is being received from the switch fabric.

2. An ATM protocol adapter as set forth in claim 1 wherein the multicast logic further includes last-cell logic for determining the daughter cell just generated is the last daughter cell that is needed for multicasting the payload in the current mother cell.

3. An ATM protocol adapter as set forth in claim 1 wherein said multicast logic further includes indexing logic for replacing the current output index with the current next-output index when the current daughter cell is generated.

4. An ATM protocol adapter as set forth in any of claims 1 to 3 further including cell update logic for updating the header of a cell using new routing information retrieved using the look-up table.

5. A method for multicasting cells in an Asynchronous Transfer Mode (ATM) protocol adapter for a cell switching system, the protocol adapter having a receive part and a transmit part, an ATM cell being received at the transmit part as a structured cell having a payload and a header including an output index already added by the receive part, the steps of said multicasting method comprising:
   setting a mother-bit in the header of each arriving structured cell to identify the cell as either a mother cell or a daughter cell;
   determining whether each mother cell is to be multicast;
   enqueuing each mother cell to be multicast in a dedicated multicast queue;
   testing the system to determine whether a new structured cell is being currently being received;
   where the preceding step indicates no new structured cell is currently being received, generating a daughter cell having the payload of the enqueued mother cell but a different destination.

6. A method as set forth in claim 5 wherein the step of generating a daughter cell further comprises:
   accessing a look-up table at a location identified by the output index to retrieve new routing information for the daughter cell;
   using the new routing information to modify the header of the cell being generated to create a destination different from the destination of the mother cell;
   resetting the mother-bit in the cell header to identify the generated cell as a daughter cell.

* * * * *